United States Patent [19]

Pelton et al.

[11] 4,293,353
[45] Oct. 6, 1981

[54] SEALING-ATTACHING SYSTEM FOR BAG TYPE AEROSOL CONTAINERS

[75] Inventors: Peter G. Pelton, St. Louis, Mo.; Sam C. Pulciani, Norridge, Ill.

[73] Assignee: The Continental Group, Inc., New York, N.Y.

[21] Appl. No.: 957,382

[22] Filed: Nov. 3, 1978

[51] Int. Cl.³ .................. B29C 27/00; C09J 5/02; C09J 5/06; C09J 5/10
[52] U.S. Cl. .................................... 156/69; 156/293; 156/294; 156/308.2; 156/309.9; 156/321; 156/322; 220/67; 220/461; 222/95; 222/386.5
[58] Field of Search .............. 222/95, 386.5, 131; 220/85 B, 67, 461; 156/69, 322, 293, 294, 321, 308.2, 309.9; 29/509

[56] References Cited

U.S. PATENT DOCUMENTS

| | | | |
|---|---|---|---|
| 2,402,943 | 7/1946 | Bogoslowsky | 156/69 X |
| 2,819,001 | 1/1958 | Pottle | 156/69 X |
| 2,889,078 | 6/1959 | Thomas | 156/69 X |
| 2,937,791 | 5/1960 | Micallef | 222/95 |
| 3,143,364 | 8/1964 | Klein | 156/294 X |
| 3,169,670 | 2/1965 | Hrebenak et al. | 222/95 |
| 3,240,394 | 3/1966 | Modderno | 222/95 |
| 3,318,985 | 5/1967 | Turner et al. | 264/267 X |
| 3,604,880 | 9/1971 | O'Neill | 156/69 X |
| 3,606,089 | 9/1971 | Chambers | 222/95 |
| 3,700,136 | 10/1972 | Ruekberg | 222/386.5 |
| 3,731,854 | 5/1973 | Casey | 222/386.5 |
| 3,896,970 | 7/1975 | Laauwe | 222/94 |
| 3,928,109 | 12/1975 | Pollock et al. | 156/69 X |

Primary Examiner—Allan N. Shoap
Attorney, Agent, or Firm—Charles E. Brown

[57] ABSTRACT

An aerosol type container wherein a separate product bag of plastics material is provided. The bag is of a larger size than the opening in which the valve cup is seated and thus must be gathered or pleated to pass through that reduced diameter opening. The initially gathered or pleated bag material is compressively engaged between the top curl defining the opening and the valve cup and is heated to a molding and bonding temperature so that a molded ring conforming to the adjacent portions of the top curl and the valve seat is formed, this part eliminating the usual need for a compound or other sealant between the valve cup and the top curl.

5 Claims, 6 Drawing Figures

U.S. Patent    Oct. 6, 1981    4,293,353
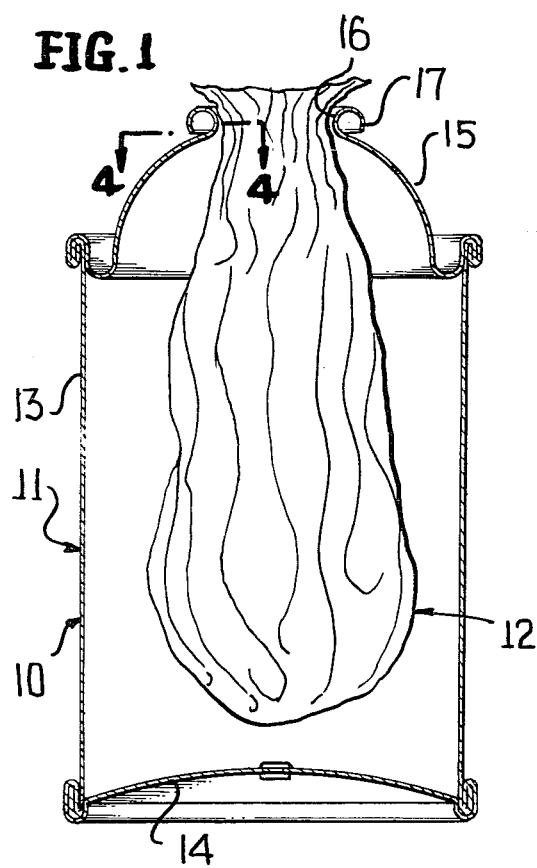
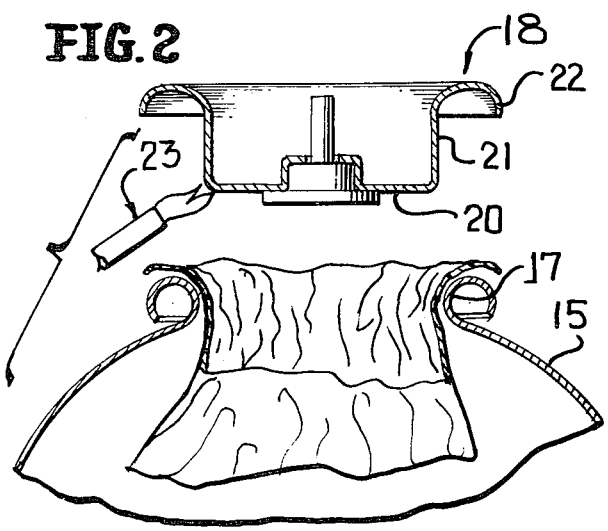
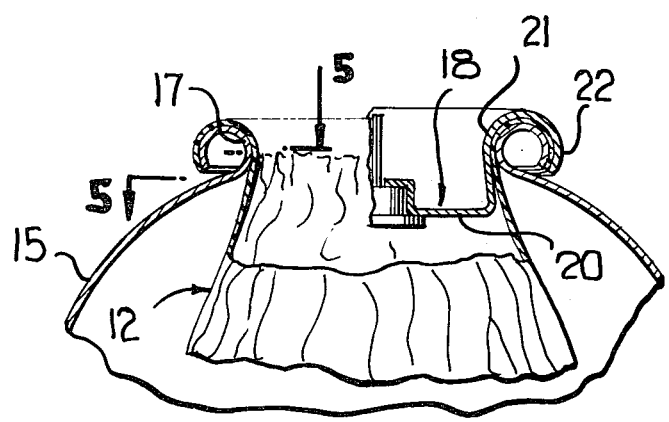
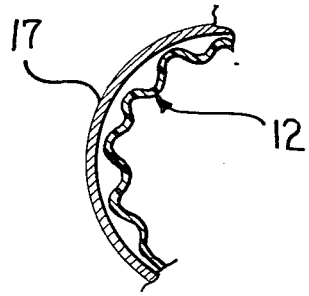
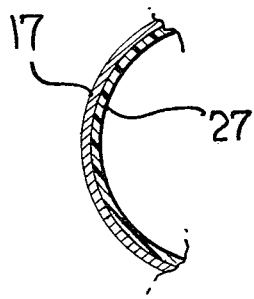
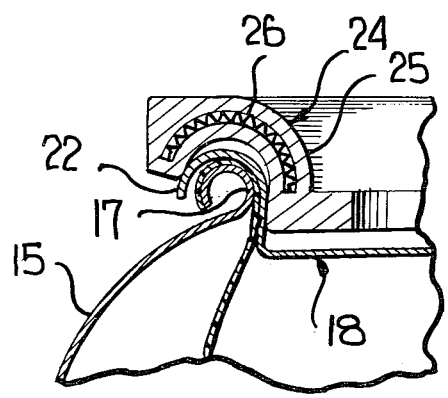

SEALING-ATTACHING SYSTEM FOR BAG TYPE AEROSOL CONTAINERS

This invention relates in general to new and useful improvements in aerosol containers, and more particularly to aerosol containers of the type having a product bag for retaining a product separate and apart from a dispensing gas.

In the conventional aerosol container, the upper end is provided with a one inch diameter opening defined by a top curl. This opening receives the customary valve cup. It is necessary that the valve cup be sealed relative to the product bag when a separate product bag is utilized, and accordingly the product bag may be beneficially extended through the opening and sealed relative to the valve cup. However, since the diameter of the opening for receiving the valve cup is only one inch as compared to the diameter of the bag as great as one and one-half inches, it will be apparent that the portion of the bag which passes through the opening must be gathered and in the form of a plurality of pleats. This pleated arrangement is irregular and the bag between the valve cup and the top curl may vary from one to three thicknesses, with the result that sealing of the bag relative to either the top curl or the valve cup is very questionable.

In accordance with this invention it is proposed to take advantage of the easy moldability of the plastics material from which the bag is formed by heating that part of the bag which would normally be between the top curl and the valve cup to a flowable and bondable temperature, and thereby make that part of the bag of a substantially uniform thickness and of an integral construction.

Further, in accordance with this invention, it is proposed to utilize the top curl as one molding surface and the valve cup as the other molding surface with pressure being applied on the gathered bag part disposed between the top curl and the valve cup.

Finally, it is also proposed to utilize the valve cup as a heat transferring means by either preheating the valve cup or applying a heating unit to the valve cup after it is seated within the top curl.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a vertical sectional view through a conventional aerosol can having loosely positioned therein a product bag of a greater size than the diameter of the top curl.

FIG. 2 is an enlarged fragmentary vertical sectional view through the upper part of the can and bag of FIG. 1, and shows a conventional valve cup about to be applied.

FIG. 3 is an enlarged fragmentary sectional view similar to FIG. 2, with the valve cup applied and having been used to effect heating and molding of the bag.

FIG. 4 is an enlarged fragmentary horizontal sectional view taken generally along the line 4—4 of FIG. 1, and shows the gathered or pleated arrangement of that part of the product bag disposed within the opening defined by the top curl.

FIG. 5 is a similar transverse horizontal sectional view taken generally along the line 5—5 of FIG. 3, and shows the same part of the product bag as shown in FIG. 4 in its bonded and molded state.

FIG. 6 is an enlarged fragmentary sectional view taken through the upper part of the can and bag assembly of FIG. 1, with the valve cup applied and with the valve cup being heated by means of a heating element associated therewith.

Referring now to FIG. 1 in particular, it will be seen that there is illustrated a conventional aerosol container 10 which includes a can, generally identified by the numeral 11, and a bag 12.

The can 11 may be of any conventional construction with the illustrated can being a three-piece can including a body 13, a bottom end unit 14 and a top end unit 15. The top end unit 15 is of the conventional dome-like construction and has an opening 16 therethrough defined by an upwardly and outwardly turned top curl 17.

The illustrated can 11 would have a diameter on the order of two and eleven-sixteenths inches while the opening 16 has a diameter of one inch. While the bag 12 would not necessarily have a diameter such as completely to fill the body 13, it would definitely have a diameter in excess of one inch, as is clearly shown in FIG. 1. Accordingly, in order that the top part of the bag 12 pass through the opening 16, it is necessary that the top part be gathered or pleated as shown most particularly in FIGS. 1 and 4.

It is to be understood that the bag 12 is formed of a suitable plastics material and may well be formed of a lamination of the plastics film material. It is to be understood that the pleating or gathering shown in FIG. 4 cannot be avoided and that as a result the gathered part of the bag 12 is between one and three thicknesses at any given point.

In FIG. 2 there is illustrated a conventional valve cup, generally identified by the numeral 18. The valve cup 18 includes a base 20, a cylindrical body wall 21 and a curl or flange 22. The body wall 21 is of a diameter snugly to fit within the opening 16 with the bag extending through the opening 16. Notwithstanding the fact that the valve cup 20 will tightly compress the upper part of the bag 12 against the top curl 17, it will be apparent that there will be leak passages both between the curl 17 and the bag 12 and between the valve cup 20 and the bag 12. Thus, both propellant and product may escape from the can 11.

It is to be understood that the bag 12, even when it is of a laminated film construction, is formed of thermoplastic material which when heated is not only self-bonding but also readily moldable. In view of this, and in accordance with this invention, it is proposed to mold the gathered upper part of the bag 12 between the valve cup 18 and the top curl 17 utilizing the top curl and the valve cup as mold components. It is also necessary to heat the plastics material to a known temperature where not only is the thermoplastic material readily flowable or moldable, but also where the thermoplastic material is self-bonding.

It will be apparent that the necessary heating of the bag may be accomplished by heating the valve cup 18. In FIG. 2 there is illustrated heating means 23 for heating the valve cup prior to its insertion within the opening 16. While such heating means has been illustrated as being of the flame type, it is to be understood that any conventional type of heating means may be utilized, including induction heating.

Reference is now made to FIG. 6 wherein there is shown associated with the valve cup 18 a heating unit generally identified by the numeral 24. The heating unit 24 is in the form of a heat transferring member 25 having a configuration facilitating the seating thereof within the valve cup 18 and in intimate contact with the flange or curl 22. The heating unit 24 is illustrated as having an electrical resistance heating element 26, although other types of heating elements may be utilized.

Reference is now made to FIG. 5. It will be readily apparent from that figure that when proper molding pressures and heat are applied to the gathered part of the bag 12 disposed between the top curl 17 and the valve cup 18, the bag part flows and self-bonds so as to be of a uniform integral construction of a substantially identical thickness throughout its circumference. This molded and bonded part of the bag 12 is identified by the numeral 27 and serves not only to provide the necessary seal with both the container 11 and the valve cup 18, but also eliminates the need for any sealing compound between the valve cup and the bag or between the bag and the top curl.

Thus by the simple expedient of utilizing the top curl 17 and the valve cup 18 as mold elements and applying heat to heat the upper part of the bag 12 to a molding and bonding temperature, the excess bag material may be uniformly distributed and at the same time form an adequate sealing layer between the valve cup and the top curl.

It is to be understood that after the valve cup has become fully seated on the curl and molding of the upper part of the bag has been effected, the valve cup is sealed in place by the radial outward expansion of the valve cup body 21 clamping the molded bag portion against the top curl 17.

Although only a preferred embodiment of the aerosol container assembly has been illustrated and described, as well as the two basic modes of forming the same, it is to be understood that minor variations may be made both in the mounting of the valve cup and the method of forming the seal between the valve cup and the container without departing from the spirit and scope of the invention as defined by the appended claims.

We claim:

1. A method of installing a product bag in an aerosol container having an upper end defining a reduced diameter opening and wherein said bag is of a cross section greater than said opening, said method comprising the steps of gathering an upper part of said bag and having the gathered bag part pass through said opening, and then heating and molding the gathered bag part against that part of said upper end defining said opening to form a unitary substantially constant thickness seal defining part aligned with and conforming to said opening, seating a valve cup in said opening and sealing said valve cup relative to said opening by said seal defining part, said valve cup being seated in said opening in advance of said heating and molding step, and said valve cup being utilized in conjunction with said upper end to effect said molding.

2. The method of claim 1 wherein said heating is effected through said valve cup.

3. The method of claim 1 wherein said heating is effected through said valve cup and said valve cup is heated after being seated in said opening.

4. The method of claim 1 wherein said heating is effected through said valve cup and said valve cup is heated before being seated in said opening.

5. A method of installing a product bag in an aerosol container having an upper end defining a reduced diameter opening and wherein said bag is of a cross section greater than said opening, said method comprising the steps of gathering an upper part of said bag and having the gathered bag part pass through said opening, and then heating and molding the gathered bag part against that part of said upper end defining said opening to form a unitary substantially constant thickness seal defining part aligned with and conforming to said opening, the container having a body, said bag having a bag form prior to being inserted into the container, and the bag cross section generally approaching the cross section of the container body.

* * * * *